United States Patent [19]

Scott

[11] Patent Number: 6,098,011

[45] Date of Patent: Aug. 1, 2000

[54] EFFICIENT FUZZY LOGIC FAULT ACCOMMODATION ALGORITHM

[75] Inventor: Michael W. Scott, Chandler, Ariz.

[73] Assignee: AlliedSignal, Inc., Morris Township, N.J.

[21] Appl. No.: 09/081,037

[22] Filed: May 18, 1998

[51] Int. Cl.[7] .................................................. G06F 19/00
[52] U.S. Cl. ............................ 701/100; 701/54; 701/57; 701/106; 701/107; 318/564; 318/565; 706/900; 60/39.75
[58] Field of Search ...................... 701/100, 106, 701/40, 36, 54, 57; 60/239, 624, 39.75; 318/564, 565; 706/900, 904, 905, 906, 907

[56] References Cited

U.S. PATENT DOCUMENTS

| | | | |
|---|---|---|---|
| 4,922,425 | 5/1990 | Mack et al. | 701/63 |
| 4,928,242 | 5/1990 | Suzuki | 701/29 |
| 4,951,205 | 8/1990 | Lowe et al. | 701/63 |
| 5,001,640 | 3/1991 | Matsumoto et al. | 701/77 |
| 5,375,056 | 12/1994 | Nitschke et al. | 701/32 |
| 5,410,495 | 4/1995 | Ramamurthi | 364/511.05 |
| 5,414,645 | 5/1995 | Hirano | 364/551.01 |
| 5,436,826 | 7/1995 | O'Flarity | 701/79 |
| 5,449,495 | 9/1995 | Goto | 422/111 |
| 5,481,648 | 1/1996 | Volponi et al. | 395/51 |
| 5,517,424 | 5/1996 | Marcelle et al. | 364/494 |
| 5,548,528 | 8/1996 | Keeler et al. | 364/497 |
| 5,576,970 | 11/1996 | Goto | 364/500 |
| 5,617,039 | 4/1997 | Kuck et al. | 324/771 |
| 5,617,337 | 4/1997 | Eidler et al. | 364/551.01 |
| 5,652,485 | 7/1997 | Spiegel et al. | 318/147 |
| 5,671,141 | 9/1997 | Smith et al. | 701/29 |
| 5,680,409 | 10/1997 | Qin et al. | 371/48 |
| 5,718,111 | 2/1998 | Ling et al. | 60/39.02 |
| 5,806,052 | 9/1998 | Bonissone et al. | 706/4 |

OTHER PUBLICATIONS

ASME Paper 97–GT–222 "Model Based Fuzzy Logic Sensor Fault Accommodation", Healy et al, Jun. 2, 1997 and the MathWorks exerpts "Fuzzy Logic Tool Box for use with MATLAB", The Math Works, Inc., Jan. 1995 pp. 2–53 through 2–58.

*Primary Examiner*—William A. Cuchlinski, Jr.
*Assistant Examiner*—Yonel Beaulieu
*Attorney, Agent, or Firm*—Robert Desmond, Esq.

[57] ABSTRACT

A simplified fault logic accomodation control which utilizes fuzzy logic to assist in calculating a preselected weighted average of the values of two redundant sensors that are sensing the same parameter. A synthesized, third, predicted value of the parameter is used in the fuzzy logic to arbitrate between the two sensed values.

17 Claims, 6 Drawing Sheets

EFFICIENT FUZZY LOGIC FAULT ACCOMMODATION ALGORITHM

BACKGROUND OF THE INVENTION

1. Field of the Invention

This invention pertains to a fuzzy logic fault accommodation control system, and pertains more particularly to a gas turbomachine utilizing such a control.

2. Description of the Prior Art

In certain control systems the required reliability and safety of operation often requires that redundant sensors be utilized to sense the value of a parameter which is being utilized in the control system. For further reliability and/or safety of operation, such a control system may also include a predicted value for the operating parameter, often times dependent upon other operational parameters. In such a system the controller is therefore presented with three values of the parameter—the two sensed values and the synthesized value—and the control system must include discriminator criteria to determine which value to utilize for the parameter.

One application of such a control may be a gas turbine engine utilized for aircraft propulsion or the like. Here, efficient and reliable operation is paramount. Thus, a gas turbine will often include at least two sensors for sensing a critical control parameter such as the air pressure or the temperature at a certain location or station within the engine. Such a gas turbine engine controller typically includes a predetermined engine modeling scheme within the controller itself. The engine model continuously generates a synthesized signal, based upon prior experience, of what the value of the particular parameter being sensed is predicted to be.

Various arrangements have been offered in the prior art for discriminating or deciding which single value to use for the parameter. Some simplistic systems simply either choose one or the other of the sensed values, or may use the synthesized value instead of either sensed value in certain circumstances. Such a system is primarily concerned with accommodation of a faulty or failed sensor, and merely picks or chooses which one of the three values to be used. A far more sophisticated sensor fault accommodation discriminator is described in ASME paper 97-GT-222, "Model Based Fuzzy Logic Sensor Fault Accommodation", Healy et al, Jun. 2, 1997. Such arrangements as described in this paper require very large, accurate engine models and require large amounts of processor time and memory for implementation.

SUMMARY OF THE INVENTION

Accordingly, an important object of the present invention is to provide a control system of the type described which is far more efficient to implement in a digital processor by utilizing far less processor time and memory.

In summary, the present invention contemplates an improved method for determining the single output of the parameter for further use in the system by discriminating between the two sensed values and the synthesized value of the parameter in the following manner: determining first and second errors by comparing the two sensed values to one another and by comparing the synthesized value to both of the sensed values; then utilizing a fuzzy logic look-up table for determining a graded membership of the first and second errors; and then finally calculating a preselected weighted average of the two sensed values based on the graded membership from the fuzzy logic look-up table. In this manner the single output value of the parameter for use in the control system is based on only the sensed values, i.e., the synthesized value is never utilized as the output value. Rather, the synthesized value is used as a weighted arbitrator for selecting between the two sensed values and/or a weighted average of the two sensed values.

These and other objects and advantages of the present invention are specifically set forth in or will become apparent from the following detailed description of the invention when read in conjunction with the accompanying drawings.

DETAILED DESCRIPTION OF THE INVENTION

Figure 1:
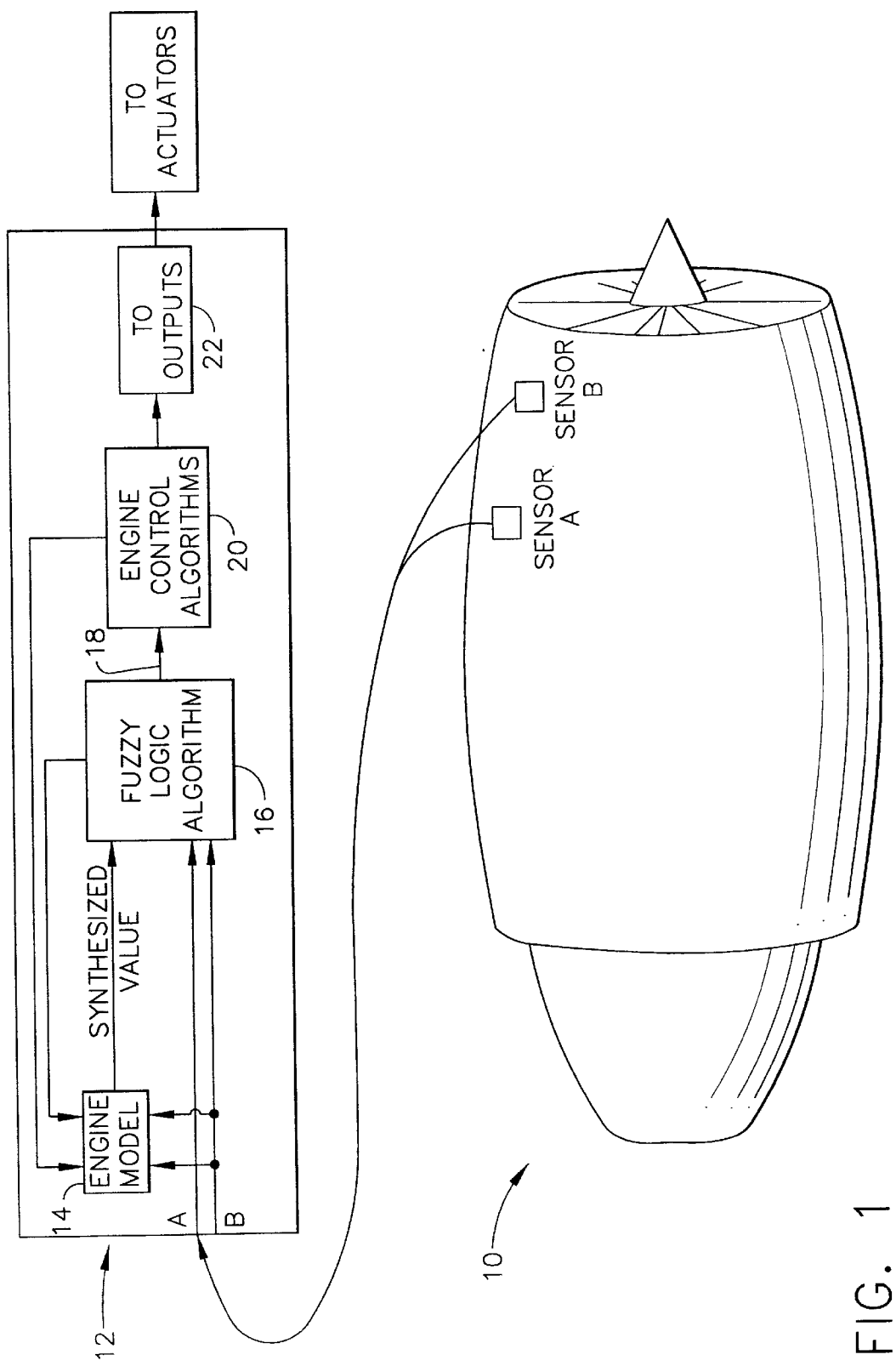
FIG. 1 is a schematic representation of a gas turbine engine utilizing the present invention.

Referring now more particularly to the drawings, a gas turbomachine is generally denoted by the numeral 10. This may be, for example, the propulsion gas turbine engine 10 for use on aircraft. The engine is equipped with an electronic controller denoted by numeral 12 which has multiple channel controls for improved reliability. To this end, the arrangement includes redundant sensors sensing the same parameter at the same location or station within the engine. As a specific example, sensor A and sensor B are both measuring compressor discharge pressure in the gas turbine engine. Both sensed values from sensors A and B are received by digital controller 12. Controller 12 further includes an electronic engine modeling arrangement denoted by the numeral 14 which is continuously operable to generate a signal that is the predicted or synthesized value of the compressor discharge pressure parameter in question. It will be apparent to those skilled in the art that the engine model 14 is operable to generate synthesized values for a variety of the operating parameters of the engines.

Controller 12 further includes a fuzzy logic fault accommodation algorithm as contemplated by the present invention and denoted by the numeral 16. As described in greater detail below, algorithm 16 is operable to generate a single value output 18 for the compressor discharge pressure. This single value for the compressor discharge pressure parameter is then submitted to the primary engine control algorithms 20 for processing. As with any control system, the resulting generated outputs 22 are then fed back to various actuators, valves, control devices and the like in the engine.

Figure 2:
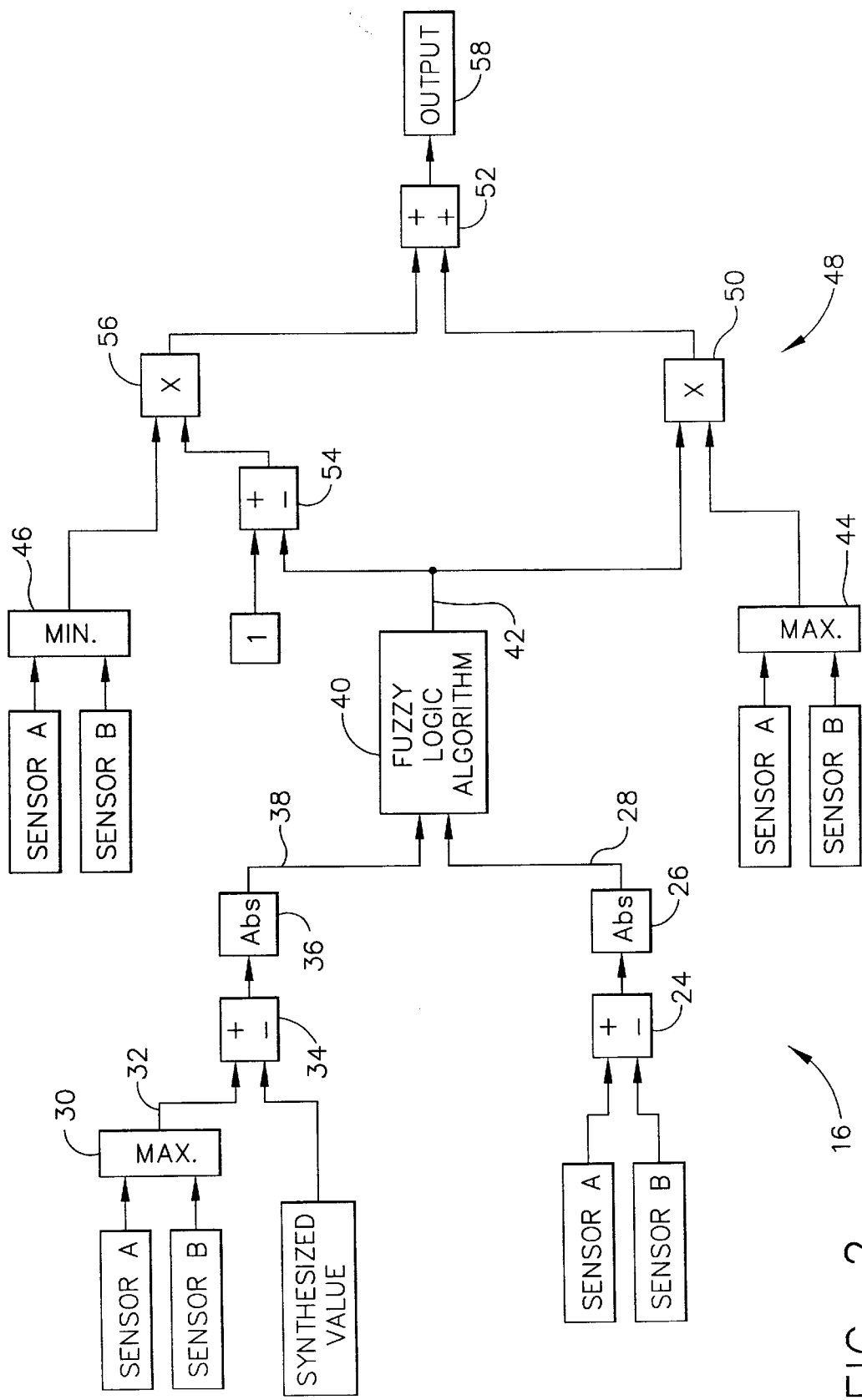
FIG. 2 is a control logic diagram as contemplated by the present invention.

The fuzzy logic algorithm 16 is illustrated in greater detail in FIG. 2 and includes a first comparator 24 operable to determine the magnitude of the difference between the values of sensor A and sensor B by subtracting one value from the other. An absolute value operator 26 then generates a first signal 28 which is the absolute value of the difference between sensors A and B. For easy reference throughout the remainder of this specification, the signal 28 is referred to as a first error 28.

Algorithm 16 further includes a selector 30 which selects the higher value or MAX value of the two sensed values A and B. This preselected value, i.e. the higher value 32, is transmitted to a second comparator 34 along with the synthesized value of the parameter in question from the engine model 14 of the controller. The illustrated comparator 34 is a subtractor like comparator 24 and therefore determines the difference between the synthesized value and the higher of the two sensed or measured values A,B. Then another absolute value operator 36 is effective to create a seond output 38 referred to for ease of reference herein as a second error 38.

It will therefore be apparent that the above described portion 24–38 of the fuzzy logic algorithm 16 is effective to transform the three input values of the parameter into two output signals in the form of first error 28 and second error 38. These two signals can then be transmitted to a fuzzy logic look-up table 40. Because only two signals remain from the original three input signals, the fuzzy logic look-up table is amenable to highly efficient, simplistic construction. Fuzzy logic look-up table 40, illustrated somewhat generally in FIG. 3 and in further detail in FIG. 4 is a Sugeno style fuzzy inference process which is far simpler and more economic to implement than the Mamdani fuzzy inference method utilized in the system described in the ASME paper referred to above. A description of Sugeno fuzzy inference and Mamdani fuzzy inference processes are set forth in the following reference which is incorporated herein by reference to the extent necessary for a full and complete understanding of the present invention: "Fuzzy Logic Tool Box for use with MATLAB", the Math Works, Inc., January 1995, Pages 2-53 through 2-58. For a further basic description of fuzzy logic control reference may be made to U.S. Pat. No. 5,718,111 incorporated by reference in its entirety herein.

Figure 3:
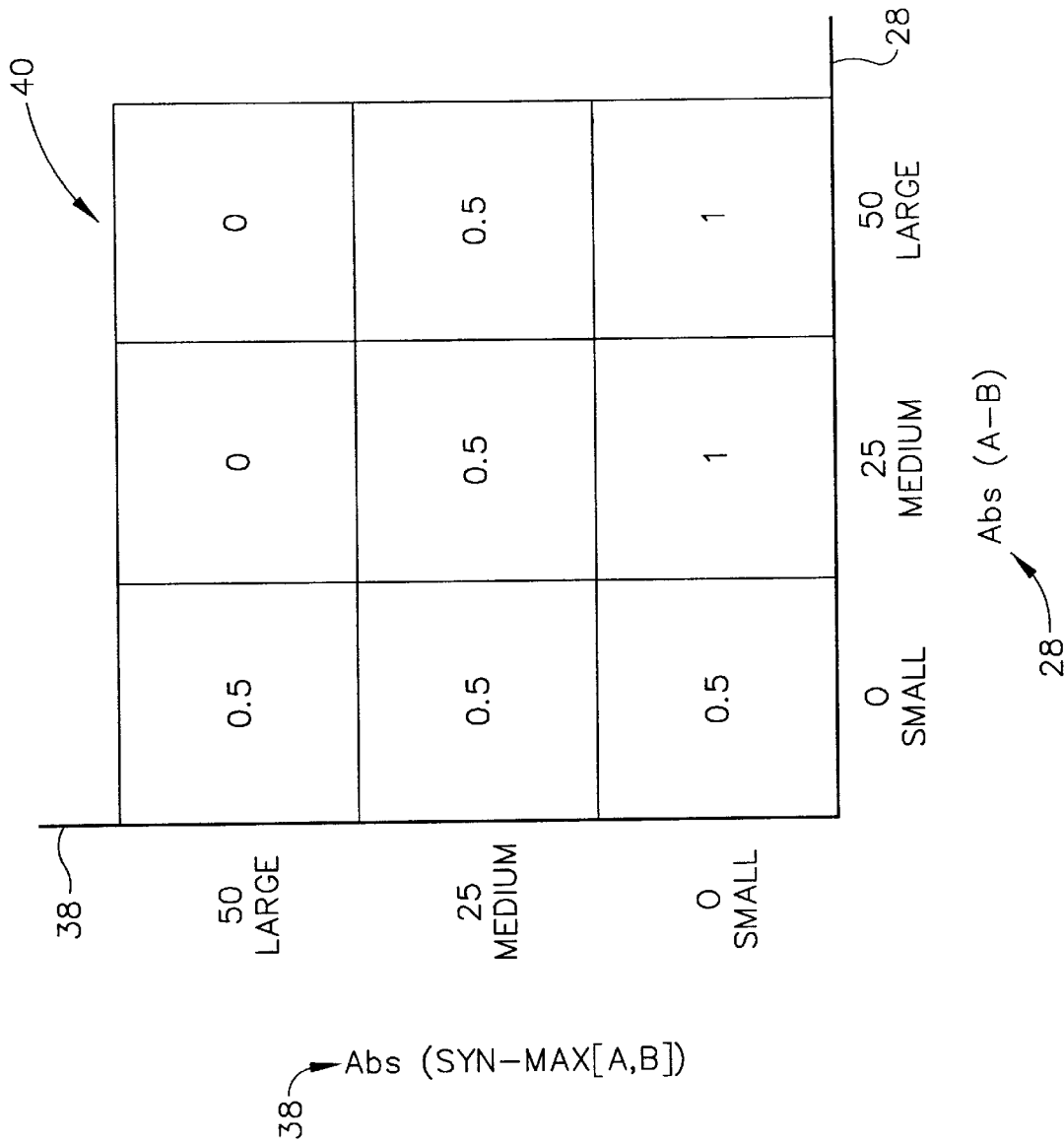
FIG. 3 is a graphical representation of the logic and values of the fuzzy logic look-up table algorithm.
Figure 4:
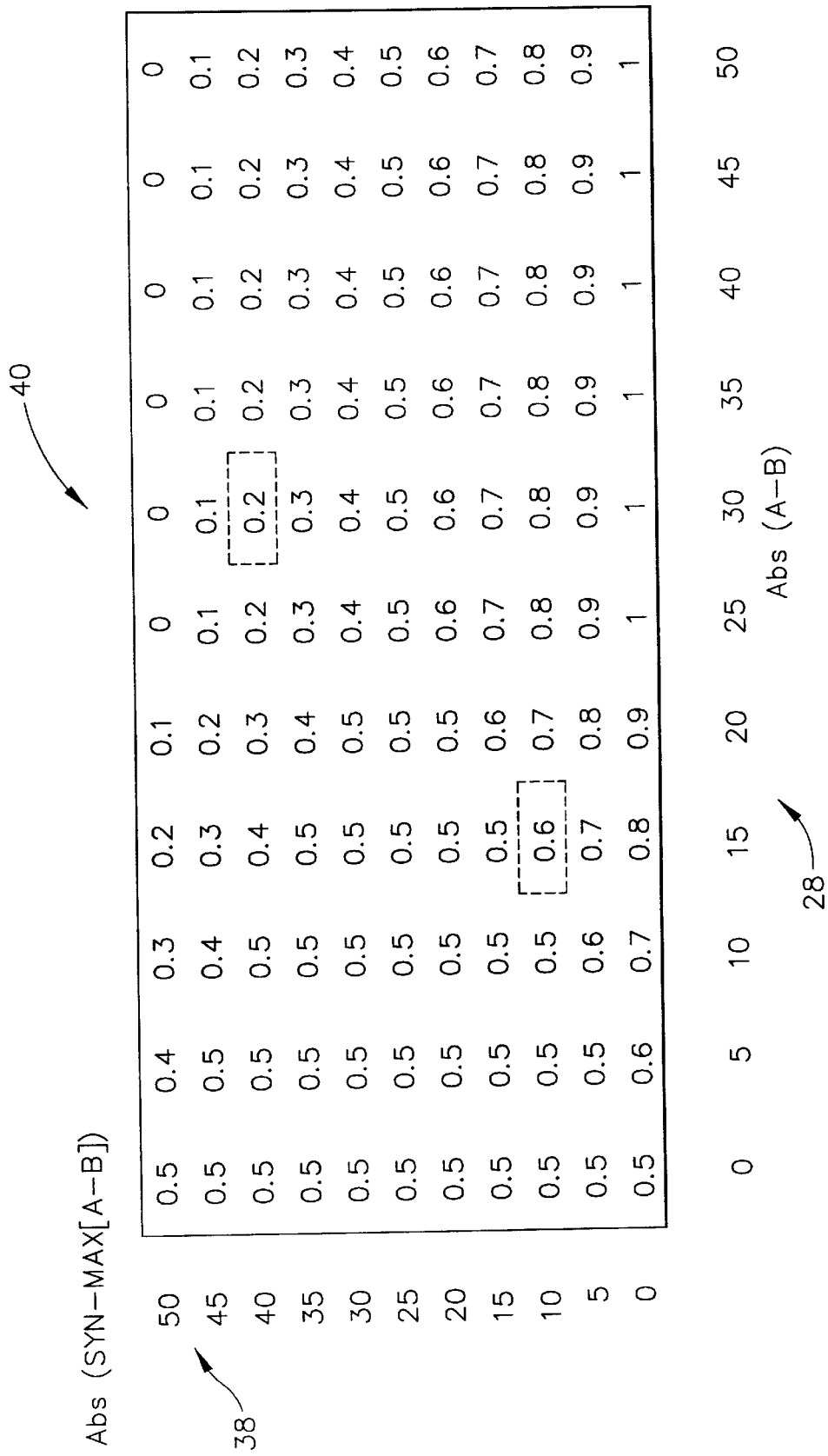
FIG. 4 is a more detailed version of the fuzzy logic look-up table of FIG. 3.

Fuzzy logic look-up table 40 receives input error 28 as the abscissa value, and the input error 38 as the ordinate value depicted in FIGS. 3 and 4. Again, in the arrangement illustrated input error 28 is the absolute value of the difference between the two sensed values A and B, i.e., Abs(A−B), and the second input error 38 is the absolute value of the difference between the synthesized value and the higher of the two sensed values A and B, i.e., Abs(SYN−max[A,B]). In a predetermined manner the input error 28 is classified as being "small", "medium", "large". For example, in the table shown it has been predetermined that a zero error would be "small", that a 25 psi difference between sensors A and B will be considered a "medium" size error, while a 50 psi difference between the two sensed sensors A and B will be "large". Similarly the second input error signal 38 is classified according to predetermined criteria to be either "small", "medium", or "large" as illustrated, the same pressure difference is utilized as the criteria for small, medium, large for the second input error 38 as is utilized with the first error 28.

The fuzzy logic look-up table is constructed according to the following fuzzy logic rules:

1) If the first error is small and the second error is small, use the average of said sensed values.

2) If the first error is small and the second error is medium, use the average of said sensed values.

3) If the first error is small and the second error is large, use the average of said sensed values.

4) If the first error is medium and the second error is small, use the higher of said sensed values.

5) If the first error is medium and the second error is medium, use the average of said sensed values.

6) If the first error is medium and the second error is large, use the lower of said sensed values.

7) If the first error is large and the second error is small, use the higher of said sensed values.

8) If the first error is large and the second error is medium, use the average of said sensed values.

9) If the first error is large and the second error is large, use the lower of said sensed values.

Reference to FIG. 3 shows that the nine boxes depicted thereon conform to the above described nine fuzzy logic rules. The fuzzy logic look-up table is operable to create a numerical output, denoted by numeral 42 in FIG. 2, within the range of zero to one. The actual look-up table is continuous in nature rather than the nine discrete boxes illustrated in FIG. 3. To represent this more continuous nature of the look-up table, FIG. 4 shows the same look-up table in a significantly finer scale to show that any value between zero and one will be created as the numerical output from 42 the fuzzy logic table 40.

Referring once again to FIG. 2, the numerical output 42 from the fuzzy logic look-up table represents the graded memberships of the first error 28 and second error 38 as determined by the fuzzy logic look-up table 40. This graded membership, expressed as a numerical output ranging from zero to one, becomes the input for the remaining portion 48 of the fuzzy logic algorithm.

The portion 48 of the fuzzy logic algorithm is operable to generate a preselected weighted average value of the two sensed values A and B as described immediately below. A multiplier 50 is operable to multiply the higher of the sensed values A and B, which is the output of a selector 44, by the numerical output 42 as one input to a summer 52. A comparator 54 calculates the value of one minus numerical output 42, which is then multiplied by the lower of the two sensed values A and B, which is the output of a selector 46, by the multiplier 56. The output of multiplier 56 is summed by summer 52 to create a single output value 58 for use as the compressor discharge pressure parameter in question.

Examples of these calculations of the portion 48 of the logic are illustrated below:

If the numerical output 42 has a value of 0:

Single output 58=0(MAX A,B)+0(MIN A,B)=MIN A,B.

If the numerical output 42 has a value of 0.5:

Single output 58=0.5(MAX A,B)+0.5(MIN A,B)

If the numerical output 42 has a value of 1:

Single output 58=1(MAX A,B)+1(MIN A,B)=MAX A,B.

Further examples of the operation of the control 16 are set forth below by reference to FIG. 4:

EXAMPLE 1

If Sensor A=85 psi, Sensor B=100 psi, and the Synthesized Value=90 psi, then:

input error 28=100−85=15 psi input error 38=100−90=10 psi

From the look-up table of FIG. 4, numerical output 42 has a value of 0.6. So:

single output 58=0.6(MAX A,B)+(1−0.6)(MIN A,B)=0.6(100)+ 0.4(85)=95 psi

EXAMPLE 2

If Sensor A=70 psi, Sensor B=100 psi, and the Synthesized Value=60, then:

input error 28=100−70=30 psi input error 38=100−60=40 psi

From the look-up table of FIG. 2, numerical output 42 has a value of 0.2, so:

Single output 58=0.2(MAX A,B)=(1−0.2)(MIN A,B)=0.2(100)+ 0.8(70)=76 psi

It is important to note that the portion 48 of the control 16 is effective to generate a weighted average which is biased towards the higher of the two sensed values A and B. This is because selector 30 is constructed to select the maximum or higher of the sensed values A and B. This is particularly useful when the control system is utilized in sensing a parameter wherein the sensors fail to a very low number. For example, a pressure sensor will create an output signal of zero pressure when it fails. Accordingly for the compressor discharge pressure parameter being discussed, the selector 30 is designed to select the higher of the two sensed values.

Figure 7:
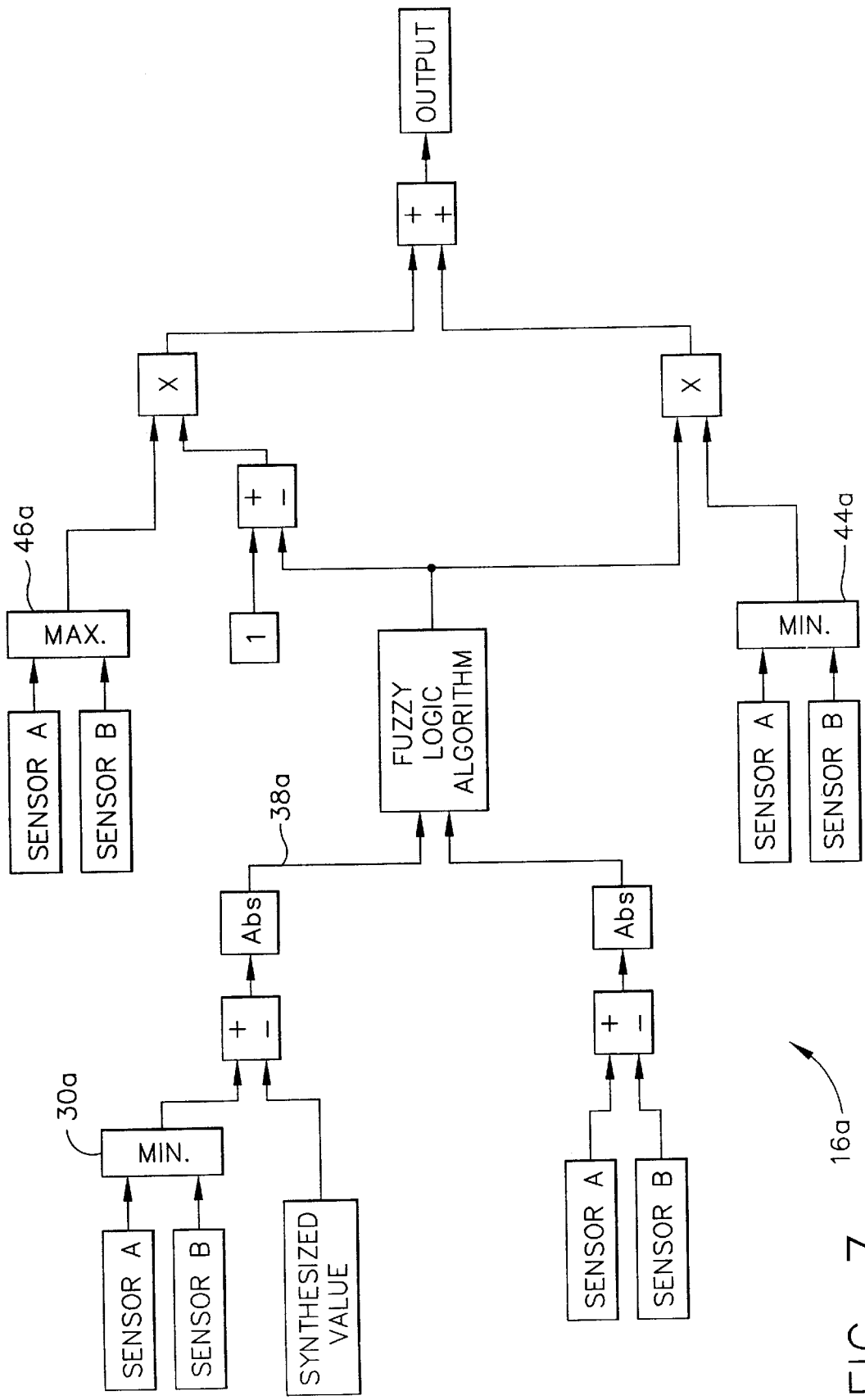
FIG. 7 is a diagram similar to FIG. 2 but showing an alternate embodiment of the invention.

An alternate arrangement is illustrated in FIG. 7 for use with a dual control channel which is sensing a parameter wherein the sensors tend to fail to a very large output number. For example, many types of thermocouple sensors will generate an extremely high temperature number when the thermocouple fails. According by, the FIG. 7 control 16a creates a weighted average which is biased towards the lower sensed value of A and B. To accomplish this, control 16a has the three comparators or selectors reversed; that is, comparator 30a is designed to selected the lower or the minimum of the two sensed values A and B, as is the comparator 40a. Comparator 46a is also reversed from the FIG. 2 arrangement to select the higher or maximum of the two sensed values A and B. Since otherwise the operations performed by the control 16a are the same as those performed by control 16 of FIG. 2, it will be straightforwardly apparent that the second input error 38a in FIG. 7 will be the difference between the synthesized value and the lower of the two sensed values. Thus the control 16a of FIG. 7 is useful for a gas turbine engine wherein the two redundant sensors A and B are sensing temperature at a preselected station within the engine.

From the foregoing it will be appreciated that an important feature and advantage offered by the present invention is that the arbitrary or synthesized value is not utilized in calculating the single output value. Rather, the single output value 58 is calculated from the two sensed values A and B. The synthesized value is utilized to arbitrate between the two sensed values A and B but is not used in the actual calculation for the output value 58.

Figure 5:
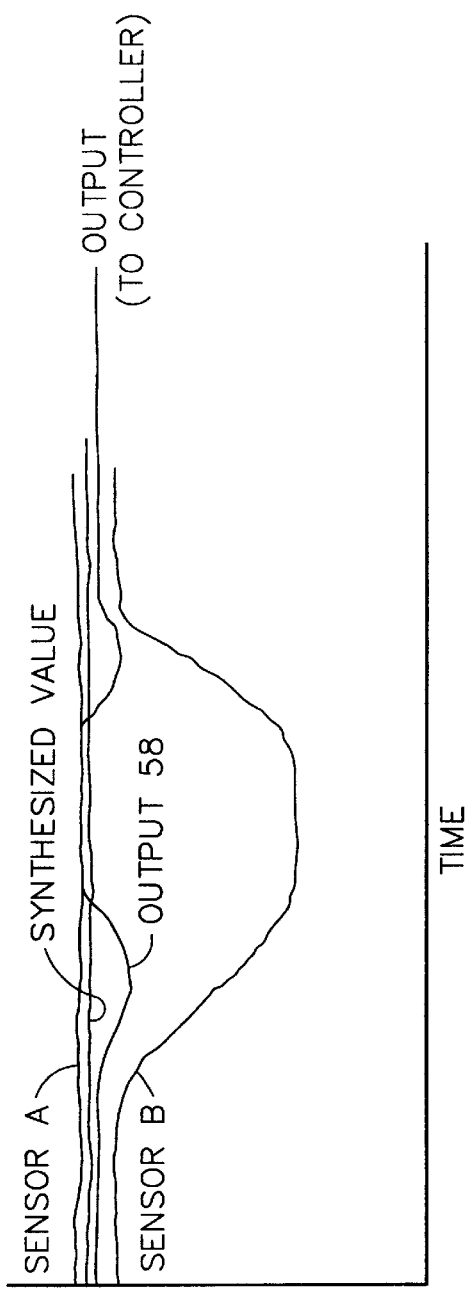
FIG. 5 is a graphical representation of the operation of the present invention.
Figure 6:
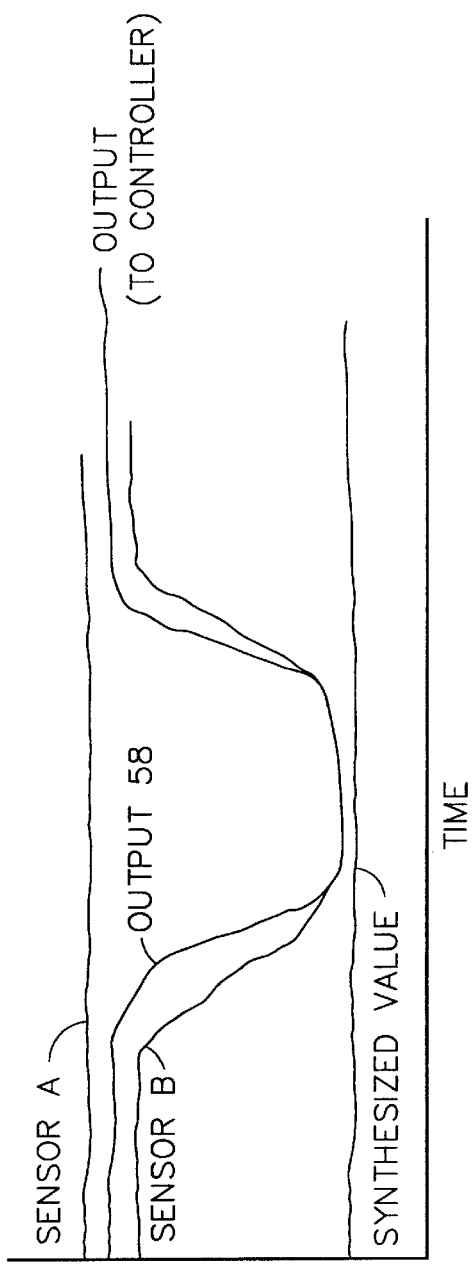
FIG. 6 is another graphical representation of operation of the present invention.

Other important advantages of the invention are apparent from FIGS. 5 and 6. FIG. 5 illustrates that a sudden drop in the value of sensor B results in an output signal which tends to start dropping as the value of Sensor B drops, but then returns to the value of sensor A when sensor B drops to an extremely low value, indicative of its failure. Then, return of sensor B at a later time towards its original value causes the output value to dip slightly and promptly return to the original value. In this sequence it is apparent that the output value does not experience a sudden and significant change in value. This is important inasmuch as a sudden and rapid change in the value of the sensed parameter can cause the downstream engine control algorithms 20 to sometimes react rather violently. Accordingly, the present arrangement provides a more stable, reliable and efficient operational system.

Similarly, in the event depicted in FIG. 6 there is again a significant change in the value sensed by sensor B. In this situation the synthesized value is quite lower than both of the sensed values A and B. The output value will therefore gradually drop towards the lower sensor value B. Again, upon return of sensor value B towards its original state, the output signal will gradually follow to that point. The system of FIG. 6 is a characteristic of the control system 16a set forth in FIG. 7 in as much as it is biased toward the lower of the sensor values A and B.

From the foregoing it will be apparent that the present invention contemplates a control system having redundant sensors and a synthesized value for the parameter being measured, wherein an improved method and apparatus is utilized to determine a single output value of the parameter for further use in the control system. This method includes the step of determining a first error 28 by comparing sensed values A and B to one another, preferably by determining the difference between A and B; the step of determining a second error 38 by comparing A and B to the synthesized value, preferably by determining the difference between the synthesized value and either the maximum of A and B (FIG. 2) or the minimum of A and B (FIG. 7); then the step of determining a graded membership of the first and second errors 28 and 38 from a fuzzy logic look-up table 40; and finally calculating a preselected weighted average of A and B based on the graded membership. A preferred manner of calculating the weighted average includes multiplying the selected one of A and B (either the minimum or the maximum of A and B) by the numerical output from the fuzzy logic look-up table 40 to produce a first weighted output; also multiplying the other of A and B by one minus the numerical output 42 to produce a second weighted output; and then finally summing the first and second weighted outputs to produce the preselected weighted average.

From the foregoing it will be further apparent that the present invention has applicability in a variety of different control systems for use in either controlling a process or for controlling the operation of a machine. Also, other manners of determining the weighted average of the value sensors A and B may be utilized in certain circumstances. Additionally, the comparators 38, 44, 46 may be of different form than a mere selector between the two values A and B, as dependent upon the nature of the control desired. The actual construction of the fuzzy logic look-up table 40 may also be readily adjusted or modified to accommodate the characteristics of the particular parameter being made, and the desired output thereof.

Other alterations and modifications of the detailed description of preferred arrangements of the invention will be apparent to those skilled in the art. Accordingly, the foregoing should be considered as exemplary in nature and not as limiting to scope and spirit of the invention as set forth in the appended claims.

Having described the invention with sufficient clarity that those skilled in the art may make and use it, what is claimed is:

1. In a control system having redundant sensors providing at least two sensed values of a single parameter being measured, and having means for generating a synthesized value of said parameter; a method of determining a single output value of said parameter for use in the control system, comprising the steps of:

determining a first error by comparing said sensed values to one another;

determining a second error by comparing said sensed values to said synthesized value;

determining a graded membership of said first and second errors from a fuzzy logic look-up table; and calculating a preselected weighted average of said sensed values based on said graded membership, said preselected weighted average being the single output value of said parameter for use in the control system.

2. A method as set forth in claim 1, wherein said step of determining the first error includes determining the difference between said sensed values.

3. A method as set forth in claim 1, wherein said step of determining the second error includes:

selecting one of the sensed values according to a predetermined criteria; and determining the difference between said synthesized value and said selected one of the sensed values.

4. A method as set forth in claim 3, wherein said step of determining the first error includes determining the difference between said sensed values.

5. A method as set forth in claim 4, wherein said selecting step comprises selecting the higher of said sensed values.

6. A method as set forth in claim 4, wherein said selecting step comprises selecting the lower of said sensed values.

7. A method as set forth in claim 4, wherein said step of determining a graded membership comprises classifying said first error as being small, medium or large, and classifying said second error as being small, medium or large.

8. A method as set forth in claim 7, wherein said graded membership is determined by said fuzzy logic look-up table according to the following fuzzy logic rules:

1) if the first error is small and the second error is small, use the average of said sensed values;

2) if the first error is small and the second error is medium, use the average of said sensed values;

3) if the first error is small and the second error is large, use the average of said sensed values;

4) if the first error is medium and the second error is small, use the higher of said sensed values;

5) if the first error is medium and the second error is medium, use the average of said sensed values;

6) if the first error is medium and the second error is large, use the lower of said sensed values;

7) if the first error is large and the second error is small, use the higher of said sensed values;

8) if the first error is large and the second error is medium, use the average of said sensed values;

9) if the first error is large and the second error is large, use the lower of said sensed values.

9. A method as set forth in claim 8, wherein said graded membership is a numerical output having a value between zero and one, and wherein said step of calculating a preselected weighted average comprises:

multiplying the higher of said sensed values by said numerical output to produce a first weighted output;

multiplying the lower of said sensed values by one minus said numerical output to produce a second weighted output; and summing said first and second weighted outputs to produce said preselected weighted average.

10. In a control system having redundant sensors providing at least two sensed values of a single parameter being measured, and having means for generating a synthesized value of said parameter; a method of determining a single output value of said parameter for use in the control system, comprising the steps of:

determining a first error based on the difference between said sensed values;

selecting one of the sensed values according to a predetermined criteria;

determining a second error based on the difference between said synthesized value and said selected one of the sensed values;

determining a graded membership of said first and second errors from a fuzzy logic look-up table; and calculating a preselected weighted average of said sensed values based on said graded membership, said preselected weighted average being the single output value of said parameter for use in the control system.

11. A method as set forth in claim 10, wherein said graded membership is a numerical output having a value between zero and one, as determined by said fuzzy logic look-up table.

12. A method as set forth in claim 11, wherein said step of calculating a preselected weighted average comprises:

multiplying said selected one of the sensed values by said numerical output to produce a first weighted output;

multiplying the other of said sensed values by one minus said numerical output to produce a second weighted output; and summing said first and second weighted outputs to produce said preselected weighted average.

13. A method as set forth in claim 12, wherein selecting step comprises selecting the higher of said sensed values.

14. A method as set forth in claim 12, wherein said selecting step comprises selecting the lower of said sensed values.

15. A method as set forth in claim 1, wherein said control system controls operation of machinery, and said single parameter is associated with operation of the machinery.

16. A method as set forth in claim 15, wherein said machinery is a gas turbine engine, said single parameter being an operating pressure at a preselected station within the engine.

17. A gas turbomachine including: redundant sensors producing at least two sensed values of a single parameter associated with turbomachine operation; means for generating a synthesized value of said parameter; a control system for the turbomachine, said control system receiving said two sensed values and said synthesized value; and means for producing a single output value of said parameter for further use in the control system, comprising:

a first comparator for comparing said sensed values to one another to generate a first error signal;

a second comparator for comparing said sensed values to said synthesized value to generate a second error signal;

a fuzzy logic look-up table for determining a graded membership of said first and second error signals; and means for calculating said single output value of said parameter as a preselected weighted average of said sensed values based on said graded membership.

* * * * *